May 20, 1930.  W. I. JONES  1,759,560

SEPARABLE FASTENER

Filed Feb. 11, 1928

Inventor:
Walter I. Jones
by Emery, Booth, Janney & Varney
Attys

Patented May 20, 1930

1,759,560

UNITED STATES PATENT OFFICE

WALTER I. JONES, OF ARLINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed February 11, 1928. Serial No. 253,731.

My invention aims to provide improvements in separable fasteners particularly of the three-side lock type.

In the drawings which illustrate preferred embodiments of my invention:—

Figure 1:
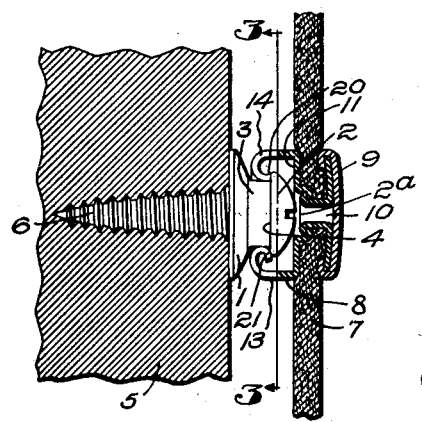
Figure 1 is a vertical section taken through a fastener installation, the stud being shown in elevation.

Referring to the drawings, which illustrate snap fastener means particularly adapted for use where it is desirable to secure a flexible covering or curtain in place, I have provided stud and socket means of the three-side lock type.

Figure 2:
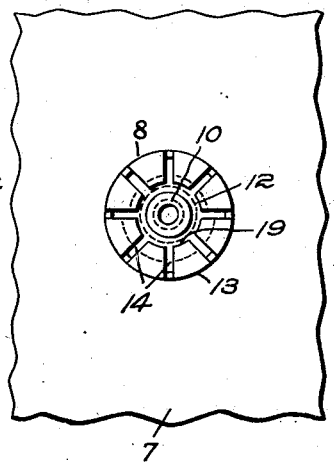
Fig. 2 is an elevation of the socket installation as viewed from the inner face of the socket support.
Figure 3:
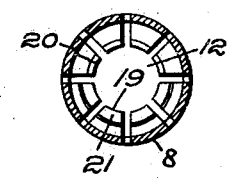
Fig. 3 is a section of the socket taken on the line 3—3 of Fig. 1.

In the embodiment of my invention illustrated by Figs. 1 through 3, I have shown a stud member 1 of a well-known construction. This stud 1 is provided with a head 2, a neck 3 and a relatively pronounced abrupt shoulder 4 between the head and neck, as clearly indicated in Fig. 1. The stud 1 may be secured to a support in any suitable manner. However, for the purposes of illustration, I have shown the stud secured to the supporting part 5, as by means of the screw 6. The head 2 is provided with a slot 2ᵃ to facilitate turning the screw into the support 5.

The socket installation, shown in Figs. 1 and 2, includes the flexible medium 7, the stud-receiving casing part 8, located at the inner face of the medium 7, and the attaching part 9 located at the outer face of the medium 7. The attaching part 9 presents a rivet portion 10 passing through the medium 7 and clenched against the base portion 11 of the casing part 8, as shown in Fig. 1.

The casing part 8 has a stud-receiving aperture 12 surrounded by a ring-like portion 13 divided by a plurality of slits 14 into a number of resilient stud-engaging fingers 19 which are U-shaped in cross-section. The wall of the ring-like portion, which is adjacent to the aperture 12, terminates in an abrupt manner for a portion of its circumference (Figs. 1 and 3), while another portion terminates in a curved manner to provide cam means. Thus, some of the fingers 19 terminate in an abrupt shouldered portion 20 around the periphery of the stud-receiving aperture 12, while the remaining fingers terminate in a curved shoulder portion 21 around the aperture, as best illustrated in Fig. 3.

When the stud and socket are engaged (Fig. 1), the abrupt shouldered portion 20 makes interlocking contact behind the shoulder 4 of the stud to prevent separation of the fastener by stresses exerted adjacent the shoulder, or at three sides of the fastener. On the other hand, the curved shoulder portion 21 provides cam means cooperating with the shoulder 4 to permit separation of the fastner by a pull at the fourth side of the fastener.

Figure 4:
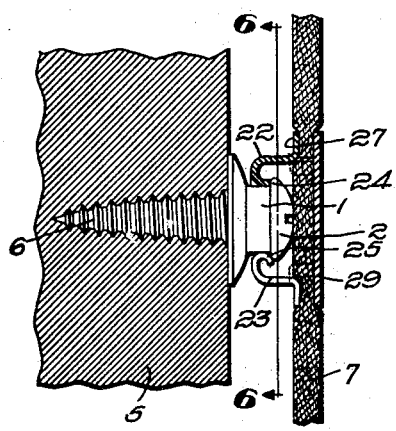
Fig. 4 is a vertical section taken through a second form of fastener installation embodying my invention.
Figure 5:
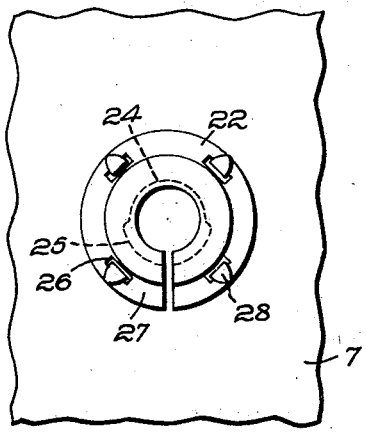
Fig. 5 is a view of the socket installation shown in Fig. 4.
Figure 6:
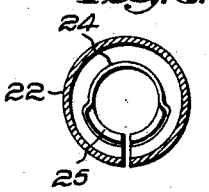
Fig. 6 is a section of the socket taken on the line 6—6 of Fig. 4.

The embodiment of my invention illustrated by Figs. 4 through 6 is directed to fastening means for the same purposes for which the above described is adapted. In this instance, however, I have shown a socket installation of slightly different construction.

The stud-engaging part 22 is divided by a single slit 23 (Figs. 5 and 6) and the part 22 is, therefore, contractible and expansible as a whole for engagement with the stud 1. The abrupt shoulder 24 and rounded shoulder 25 accomplish the same results as the shoulders 20 and 21, above described, and, therefore, further explanation of the operation of this fastener is unnecessary.

In securing this stud-engaging part 22 to its carrying medium, it is necessary to provide relatively large prong-receiving openings 26 in the base flange 27, so that the prongs 28 presented by the attaching part 29 will not interfere with the expansion and contraction thereof.

While I have shown and described two embodiments of my invention, I do not wish to be limited thereto, as the scope of my invention will be best understood by reference to the following claims.

Claims:

1. A three-side lock fastener comprising, in combination, a stud having a head, a neck and a relatively abrupt shoulder between said head and said neck, a cooperating socket including a stud-engaging part having a stud-receiving aperture surrounded by a yieldable stud-engaging wall, said wall having a flat portion surrounding a portion of the circumference of the stud-receiving aperture and engaged directly with the shoulder of the stud at three sides to prevent separation when stress is exerted between the stud and socket adjacent to those three sides and said wall having a generally curved portion for another portion of the circumference of the stud-receiving aperture to provide a rounded cam portion engaged with the fourth side of the shoulder to permit disengagement of the stud and socket by a separating stress exerted at the said fourth side adjacent to said cam portion of said wall.

2. A three-side lock fastener comprising, in combination, a stud having a head, a neck and a relatively abrupt shoulder between said head and said neck, a cooperating socket including a stud-engaging part having a stud-receiving aperture surrounded by a yieldable stud-engaging wall, said wall being divided into a number of resilient fingers substantially U-shaped in cross-section, some of said fingers terminating abruptly to make locking engagement back of said shoulder on said stud and other fingers being curved adjacent to their ends to make separable engagement with said shoulder.

3. A three-side lock fastener comprising, in combination, a stud having a head, a neck and a relatively abrupt shoulder between said head and said neck, a cooperating socket including a stud-engaging part having a stud-receiving aperture surrounded by a yieldable stud-engaging wall, said wall having a portion of its free edge terminating relatively abruptly and facing the shoulder of the stud so that the free edge makes locking engagement back of the shoulder of said stud and having another portion terminating in a generally curved cam portion to provide for separation of the fastener.

4. A fastener socket casing having a stud-receiving aperture surrounded by a wall which is substantially U-shaped in cross-section, said U-shaped wall being split to provide a resilient wall surrounding the stud-receiving aperture, said wall having a portion of its free edge terminating in an abrupt shoulder portion and another portion of said wall terminating in a generally curved shoulder portion as and for the purposes described.

5. A one-piece fastener socket casing having a wall surrounding a stud-receiving aperture, said wall being split to provide a plurality of substantially U-shaped resilient fingers surrounding the stud-receiving aperture, some of said fingers terminating in a manner to provide an abrupt shoulder portion and other of the said fingers terminating in a manner to provide a generally curved shoulder portion as and for the purposes described.

In testimony whereof, I have signed my name to this specification.

WALTER I. JONES.